United States Patent Office 2,936,442
Patented May 10, 1960

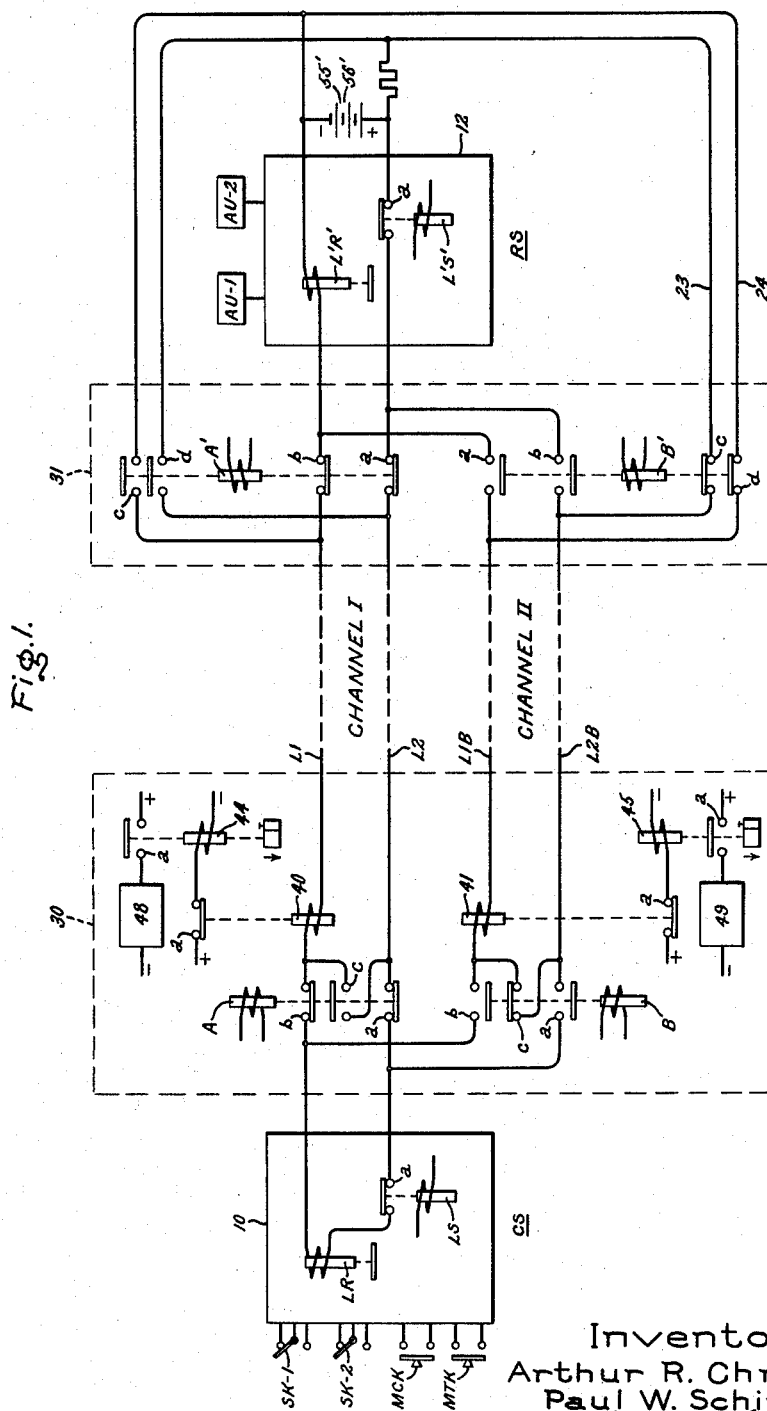

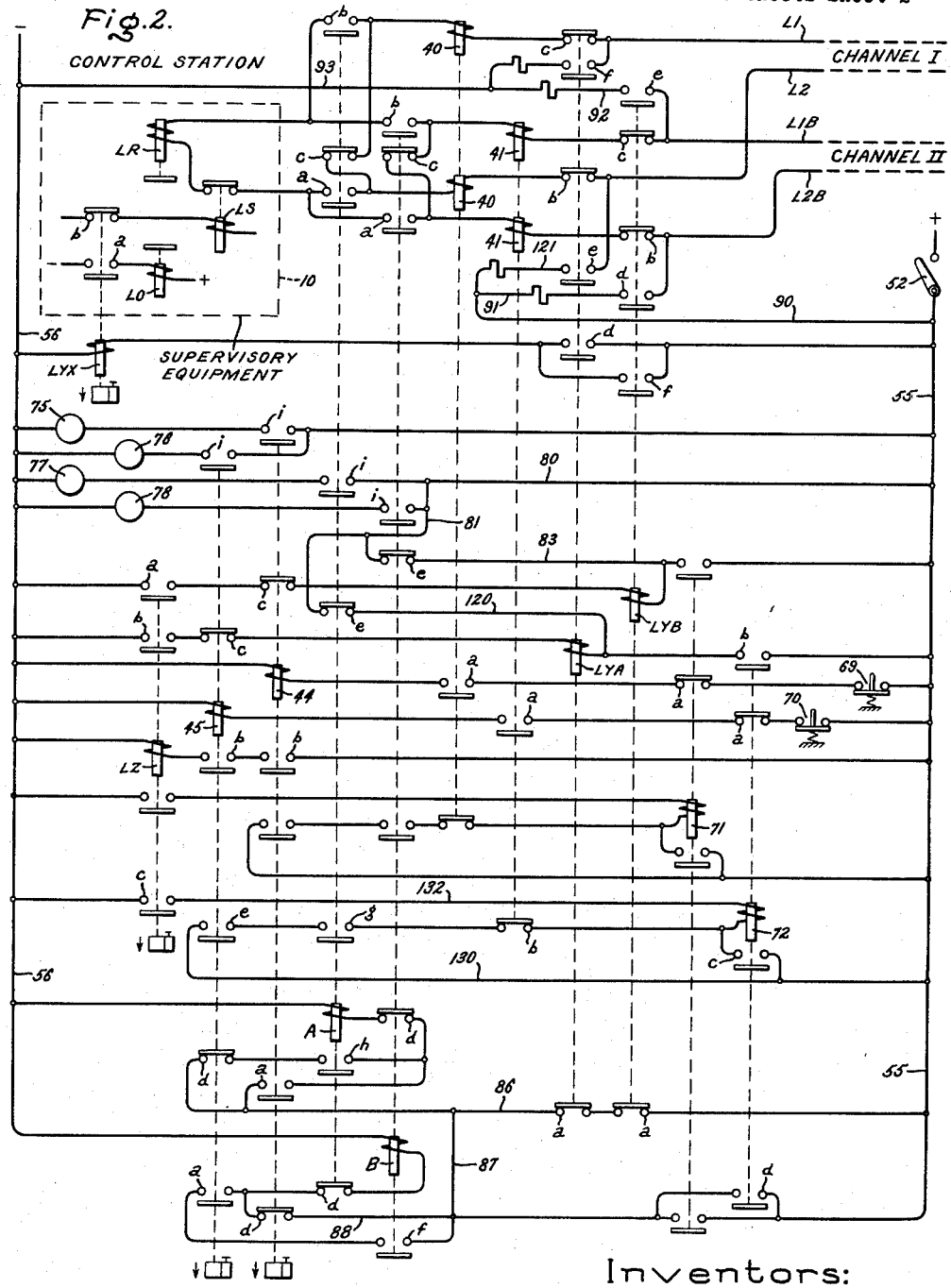

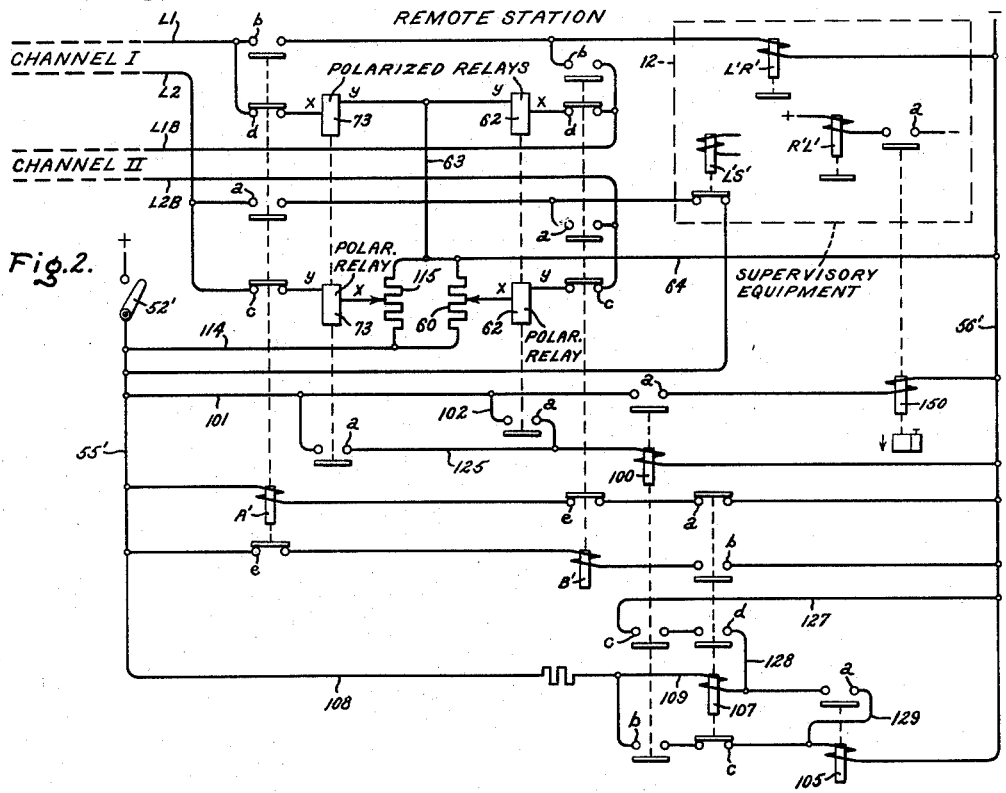

2,936,442

ALTERNATE CHANNEL SUPERVISORY CONTROL SYSTEM

Arthur R. Christman, Springfield, and Paul W. Schirmer, Bryn Mawr, Pa., assignors to General Electric Company, a corporation of New York Application August 22, 1957, Serial No. 679,639

10 Claims. (Cl. 340—163)

This invention relates to a supervisory control system for supervising and controlling remote apparatus-units in a remote station from a centrally-located control station.

More particularly, the invention relates to a supervisory control system in which the two stations are interconnected by a pair of alternate signaling channels, either of which may be relied upon apart from the other for the transmission of supervisory signals.

The invention has special, though not exclusive, application to the type of supervisory system in which the various supervisory functions are carried out by transmitting over the single channel in use codes of spaced electrical impulses corresponding to the desired supervisory function. An example of this general type of supervisory system is illustrated in detail in Purcell Patent 2,492,766, assigned to the assignee of the present invention, and reference will be made hereinafter to the Purcell system to facilitate an understanding of the present invention.

To insure against possible interruptions of operation due to channel troubles, it is sometimes desirable that means be provided for automatically transferring operation of the supervisory equipment from one channel to the other in the event of a fault on the one channel. Most prior transfer arrangements intended for this general type of service have depended for successful operation upon the use of channel-monitoring signals having frequencies different from the frequencies of the signals normally transmitted over the channels. Reliance upon such monitoring signals generally entails the use of special and separate generators for the monitoring signals, and in many cases requires special filters for isolating various components of the equipment from each other.

An object of our invention is to provide reliable and relatively inexpensive transfer equipment which not only is capable of automatically effecting channel transfer of the supervisory equipment in response to a channel fault but which, in addition, requires no separate signal generators for producing monitoring signals and no special filters for effecting isolation of the various parts of the system.

Another object of our invention is to provide automatic transfer equipment which is continuously sensitive to the working condition of both channels and which will effect a transfer only onto a channel which is in good working order.

A possible condition which might arise in this general type of system, as a result, say, of some extraneous condition or an incomplete transfer, is one in which the supervisory equipment at the control station might become connected to one channel and the supervisory equipment at the remote station might become connected to the other channel. In this regard, it is a further object of our invention to construct the transfer equipment in such a manner that it is capable of automatically correcting for such a condition of disagreement at the two stations.

Another object is to cause the supervisory equipment to reset to its normal-at-rest position should a transfer operation occur while a signalling or coding operation is in progress. This tends to preclude the possibility that the character of the signals being transmitted will be detrimentally affected by the transfer operation, thus enabling correct operation consistently to take place after channel transfer.

In carrying out our invention in one form, we provide at the remote station means for continuously applying unidirectional voltage to each of the two channels whereby unidirectional current normally flows over both channels. For supervisory operation over one of the channels, the supervisory equipments at the two stations is connected to a single one of the channels and is disconnected from the other channel. Transfer equipment is provided at each of the stations for effecting such connection and disconnection of the supervisory equipments. The supervisory equipments transmit supervisory codes over the connected channel by intermittently interrupting and re-establishing the current flowing over the connected channel with the resulting codes therefore comprising spaced current impulses which are spaced-apart by intervals of a predetermined maximum duration. Should the connected channel become faulted, then effective current will cease to flow over the connected channel at least for a duration exceeding this predetermined maximum. This condition is sensed by monitoring means at the control station which under normal conditions is insensitive to the normal pauses between the impulses of the code but which in response to the absence of current flowing over the connected channel for a duration exceeding this maximum operates to cause the transfer equipment to transfer the supervisory equipment from the connected channel to the other channel.

In further carrying out our invention in one form, the transfer operation at the remote station is begun by transmitting from the control station over the channel to which transfer is to be effected unidirectional current having a polarity reversely related to the normal unidirectional monitoring current. This reverse polarity current is applied to this latter channel automatically by the transfer equipment at the control station in response to a channel failure. The remote station transfer equipment responds to termination of this reverse polarity current by completing the transfer operation at the remote station.

For a better understanding of the invention, reference may be had to the following description taken in conjunction with the accompanying drawing, wherein:

Fig. 1 is a diagrammatic illustration partly in block form of a supervisory control system embodying the invention;

Fig. 2 is a more detailed diagrammatic illustration of the supervisory control system of Fig. 1.

Fig. 3 is a simplified diagram illustrating a particular relationship of certain basic components in the control system of Fig. 2.

The preferred embodiment of the invention is shown and described herein as it is applied to the type of supervisory system disclosed in detail in the aforesaid Purcell Patent No. 2,492,766. To simplify the present disclosure, only those parts of the Purcell system which are deemed necessary to an understanding of our invention will be described and shown in the present application. To further facilitate an understanding of our invention, the devices which are common to the Purcell system and to the disclosed system will be designated by the same reference characters. It is to be understood that these common devices are electrically connected in the supervisory equipment in the same manner in both this application and in the Purcell patent.

In Fig. 1 of the accompanying drawing we have designated the supervisory equipment at the control station CS by a block 10 and the supervisory equipment at the remote station RS by a block 12. These two stations are interconnected by a pair of alternate signalling channels. The first channel I is formed by a pair of line conductors L1 and L2 corresponding to the line conductors L1 and L2 of the Purcell patent. The second channel is similar to the first channel and comprises a pair of line conductors designated L1B and L2B.

In the schematic diagram of Fig. 1, the system is depicted in a condition wherein channel I is the channel being relied upon for supervisory operation, whereas channel II is out of operation. Under this condition, channel I is connected to the supervisory equipments at both stations by means of the transfer relays A and A'. To this end, transfer relay A at the control station has its contacts $a$ and $b$ closed to connect the control station supervisory equipment 10 to channel I, and transfer relay A' at the remote station has its contacts $a$ and $b$ closed to connect the remote station supervisory equipment 12 to channel I. Also, under the depicted condition, channel II, which is out of operation, is operatively disconnected from the supervisory equipment at both stations by means of transfer relays B and B'. To this end, transfer relay B has its contacts $a$ and $b$ open to isolate the control station supervisory equipment from channel II, and transfer relay B' has its contacts $a$ and $b$ open to isolate the remote station supervisory equipment 12 from channel II.

At the remote station RS, there are shown two apparatus units AU–1 and AU–2, individual ones of which it is desired to select and control from the control station CS. These apparatus units are assigned two separate selection points and correspond to similarly designated units in the Purcell patent. For simplicity, only two such units have been shown as contracted to the five shown in the Purcell patent. At the control station there are shown two two-position select keys SK–1 and SK–2 each of which is movable into a predetermined position to select a corresponding apparatus unit AU–1 or AU–2, for control or indication. For example, as described in detail in the Purcell patent, if the select key SK–1 is lifted into its select position while the supervisory equipment is in its normal-at-rest position, a selection code of impulses individual to select key SK–1 and apparatus unit AU–1 is transmitted over the channel I to the remote station. If this selection code correctly operates the supervisory equipment, it will render apparatus unit AU–1 controllable from the control station. Similarly, the operation of select key SK–2 when the system is in its normal-at-rest position will render apparatus unit AU–2 controllable from the control station. The supervisory equipment determines the correctness of the selection operation by automatically comparing the selection code with a check code transmitted from the remote station to the control station in response to selection of the predetermined apparatus unit. If these two codes correspond, an amber lamp (not shown) located at the control station and individual to the apparatus unit selected will be automatically energized and lighted to indicate to the dispatcher that a correct selection has been made.

Once a desired apparatus unit has been correctly selected, the dispatcher may operate it in a predetermined desired manner by actuating suitable master control keys, such as MTK or MCK located in the supervisory equipment 10 at the control station. As disclosed in the Purcell patent, if the apparatus units are circuit breakers, MTK is a master trip key which upon actuation trips the selected breaker, whereas MCK is a master close key which upon actuation closes the selected breaker. After the dispatcher has performed whatever indicating or apparatus controlling operations are desired, he may release the selected apparatus unit from his control by returning the select key to its lower or reset position.

To more clearly illustrate the manner in which codes, such as the above-mentioned selection codes and check codes, are transmitted between the supervisory equipment located in the control station and that located at the remote station, we have shown in the drawing impulse sender relays LS and L'S' and impulse receiver relays LR and L'R', all of which correspond to identically designated relays in the Purcell patent. Pairs of relays denoted by corresponding reference characters perform corresponding functions at the different stations, the primes being used to distinguish the remote station relays from the control station relays. Each of the relays LS and L'S' of the present application has been shown with only one set of contacts in contrast to the two shown in Purcell. This omission is intended merely to simplify our disclosure by eliminating parts which serve identical functions.

As described more fully in Purcell, when a selection key at the control station is actuated, the supervisory equipment 10 conveys to the coil of the impulse sender relay LS a predetermined code of spaced current impulses. The sender relay LS picks up in response to the presence of an impulse and drops out in response to the absence thereof, with the result that its contacts $a$ are repetitively opened and closed in accordance with the code conveyed to the coil of LS. In opening, the contacts $a$ of the sender relay LS interrupt a circuit across a suitable direct current source 55' 56', which in the depicted arrangement, is a line supply battery located at the remote station. This circuit includes channel I and extends from the positive terminal of the battery, through the contacts $a$ of relay L'S', through contacts $a$ of relay A', through line conductor L2 to the control station, then through the contacts $a$ of relay A, the contacts $a$ of relay LS, the coil of relay LR, the contacts $b$ of relay A, through line conductor L1, to the remote station, then through the contacts $b$ of relay A, and the coil of relay L'R' to the negative terminal of the battery. In closing, the contacts $a$ of the sender relay LS reestablish this circuit. Since this circuit includes the line conductors L1, L2, it will be apparent that the operation of relay LS impresses upon the channel L1, L2, a code duplicating the code which is conveyed to the coil of sender relay LS. Since the coil of the receiver relay L'R' at the remote station is connected in circuit with L1, L2, the relay L'R' at the remote station will be energized in accordance with the transmitted code. Assuming the system to be in the position shown in the drawing, this opening and closing of the contacts of L'R' will correspondingly complete and interrupt a receiving circuit within the remote station supervisory in accordance with the transmitted code, and, this in turn, causes the supervisory equipment to operate in a manner corresponding to the transmitted code.

In a corresponding manner, check codes are transmitted from the remote station to the control station by the impulse sender relay L'S' at the remote station. For example, when the remote station supervisory equipment has performed an operation in response to a transmitted code, it conveys to the relay L'S' a check code corresponding to the operation performed. This causes the relay L'S' to key the channel L1, L2 in accordance with the check code and thereby to energize the receiver relay LR at the control station in accordance with the check code. This relay LR responds by opening and closing a receiving circuit within the control station supervisory equipment in accordance with the check code. If this check code corresponds with the originally transmitted code, a suitable indicating lamp (not shown) is automatically lighted at the control station to indicate to the dispatcher that the equipment has correctly responded. Reference may be had to the aforesaid Purcell patent for a more complete description of exactly how the supervisory equipment generates and compares the various impulse codes.

It is also explained in the Purcell patent that the various codes consist of impulses of substantially the same length with successive impulses spaced apart by pauses of varying length.

In this regard, some of the pauses between successive impulses have a length about equal to that of the impulses, and the others have a length of about two and one-half times the length of the impulses.

The purpose of providing two channels is to have available an alternate channel for the transmission of impulse codes in the event that one of the channels becomes impaired for some reason, such as, for example, a short circuit or an open circuit at some location in the channel. For transferring operation of the supervisory equipment from either of the channels to the other, a transfer circuit 30 is provided at the control station, and a transfer circuit 31 is provided at the remote station, as will soon be explained in detail, these transfer circuits are capable of effecting a transfer either automatically in response to an impairment of one of the channels or selectively in response to a manually-initiated operation at the control station.

The general operation of transfer circuits 30 and 31 will first be described under a condition wherein both channels are assumed to be in good working order and wherein the supervisory equipment is assumed to be operating over channel I with channel II being temporarily out of operation and held in reserve. Under this condition, which is depicted in Fig. 1, the supervisory equipment is connected to channel I at both the control station and remote station by means of switching devices in the form of transfer relays A and A', respectively. To this end, transfer relay A at the control station has its contacts $a$ and $b$ closed to connect the control station supervisory equipment to channel I, and transfer relay A' at the remote station has its contacts $a$ and $b$ closed to connect the remote station supervisory equipment to channel I. Also under the assumed condition depicted in Fig. 1, channel II, which is out-of-operation, is operatively disconnected from the supervisory equipment at both stations by means of the open contacts $a$ and $b$ of the transfer relays, or switching devices, B and B'.

When the supervisory equipment is operating over channel I in the manner depicted in Fig. 1 channel I in addition to being connected to the supervisory equipment at both stations, is also connected to the terminals of the battery 55', 56' at the remote station. Under such conditions, and with the supervisory equipment at rest, current normally flows continuously over channel I between the terminals of the battery 55', 56'. This current flowing over channel I serves not only to monitor channel I (as will soon be described) but when the supervisory equipment operates serves as the current which is modified to produce the supervisory codes. To this latter end (and as previously described), opening and closing of the contacts of the sender relay LS at the control station will intermittently interrupt and reestablish this circuit across the battery terminals and thus will transmit a code over channel I to the remote station supervisory equipment 12. Similarly, opening and closing of the contacts of the sender relay L'S' at the remote station will transmit a code to the control station supervisory equipment 10 over channel I. Under the conditions depicted in Fig. 1, these codes are not transmitted over channel II inasmuch as this channel is isolated from the supervisory equipment by the transfer relays B and B'. Although in Fig. 1 channel II is not being relied upon for the transmission of codes, it too is being monitored by current supplied from the remote station. To this end, the remote station transfer relay B' has its contacts $c$ and $d$ closed, thereby connecting channel II to the terminals of the battery at the remote station through the conductors 23 and 24. In addition, transfer relay B at the control station has its contacts $c$ closed thereby completing a monitoring circuit across the line conductors L1B and L2B of channel II. It will therefore be apparent from Fig. 1 that channel II is connected across the terminals of the remote station battery 55', 56' by conductors 23 and 24 which bypass the remote station supervisory equipment 12 thereby allowing current to be continuously supplied over channel II independently of the remote station supervisory equipment. Thus, under the conditions of Fig. 1, the impulses impressed upon channel I by either of the sender relays LS or L'S' are not impressed upon channel II. Channel II simply receives a continuous flow of current from the battery 55', 56', and this current bypasses the remote station supervisory equipment by virtue of the conductors 23 and 24 and also bypasses the control station supervisory equipment 10 by virtue of the open contacts $a$ and $b$ of the transfer relay B at the control station.

Connected in series with channel I is a monitoring relay 40 located at the control station, and connected in series with channel II is a monitoring relay 41 also located at the control station. The relay 40 acts to initiate an automatic transfer of the supervisory equipment from channel I to channel II in the event of a failure of channel I while the supervisory equipment is connected for operation thereover. The other relay 41 acts to initiate an automatic transfer of the supervisory equipment from channel II to channel I in the event of a failure of channel II while the supervisory equipment is connected to operate over channel II.

The manner in which such a transfer is initiated will now be briefly described. In this regard, assume first that the supervisory equipment is connected to operate over channel I as depicted in Fig. 1. Current supplied from the remote station power supply 55', 56' over channel I will maintain monitoring relay 40 in an operated condition, and in such condition relay 40 is incapable of initiating a transfer operation. Assume now that channel I fails either as a result of an open circuit or a short circuit. The current which was normally being transmitted over channel I from the remote station battery 55', 56' will thereafter cease or fall to a much lower value, and this will cause relay 40 to drop out. Drop out of the relay 40 will open the contacts $a$ of the relay 40, and this will open the energizing circuit for an auxiliary monitoring relay 44. After a time delay, auxiliary monitoring relay 44 drops out, and this completes an input circuit to the transfer initiating means 48 shown in block form. The transfer initiating means 48 responds by causing each of the relays A and B at the control station and each of the relays A' and B' at the remote station to change position (in a manner soon to be explained in detail). A change in the position of relays A and A' disconnects channel I from the supervisory equipment at both stations, and a change in the position of relays B and B' connects channel II to the supervisory equipment at both stations. Thus, operation of the supervisory equipment has now been transferred from channel I to channel II in response to failure of channel I.

As a result of the change in position of transfer relay A' at the remote station, channel I is then connected across the terminals of the remote station battery 55', 56' independently of the supervisory equipment. Thus, channel I, although not connected for code transmission, is then being monitored by current supplied from the remote station battery 55', 56'. Channel II, on the other hand, is connected to the supervisory equipment for code transmission thereover in addition to being monitored by current from battery 55', 56'.

A transfer from channel II to channel I is effected in response to failure of channel II in a corresponding manner as the above-described transfer. More particularly, if channel II fails while it is connected to the supervisory equipment, its monitoring relay 41 drops out due to the absence of energizing current, and this allows an auxiliary monitoring relay 45 to drop out. Such drop out completes a circuit to a transfer-initiating means 49 shown in block form. Transfer initiating means 49 responds by restoring those connections which are shown in Fig. 1, thus transferring the supervisory equipment from channel I to channel II.

For preventing either of the monitoring relays 40 or 41 from initiating a channel transfer as a result of one of the normal pauses between the successive impulses of a code, the auxiliary monitoring relays 44 and 45 are provided with suitable time delay means affording time-delayed drop-out characteristics. This time delay means is so adjusted that the period required for drop out of these relays 44 and 45 is substantially longer than the maximum length of the normal pauses between the successive impulses of any of the supervisory codes. Thus, these relays remain in an operated position during transmission of codes as well as when normal monitoring current is flowing over the channels, and therefore do not drop out to activate the transfer-initiating circuits during the normal transmission of codes.

The detailed manner in which the above described monitoring and transferring operations are carried out will now be described with reference to Fig. 2, with the monitoring operation being first described.

Monitoring—in general

It is first assumed that both channels are in working order and that the control power switches 52 and 52' for the two transfer circuits 30 and 31 are closed so that voltage is present across the supply buses 55, 56 and 55', 56' for the two transfer circuits. Under these circumstances, the transfer relays, or switching devices, A and A' at the control station and the remote station, respectively, will be in an operated position thereby connecting channel I to the supervisory equipment at both stations and also connecting channel I across the terminals of the remote station power source 55', 56', as has been generally described hereinabove. The transfer or switching relays B and B' at the control station and the remote station, respectively will be in a non-operated position thereby disconnecting channel II from the supervisory equipment but connecting channel II to the power source at the remote station independently of the supervisory equipment. The energizing circuit for the transfer relay A at the control station extends from control station positive bus 55 through the then-closed contacts a of relay LYB, the then-closed contacts a of relay LYA, the contacts a of relay 44, the contacts d of relay B, through the coil of relay A to the negative supply bus 56. The energizing circuit for the transfer relay A' at the remote station extends from positive bus 55', through the coil of relay A', the then-closed contacts e of relay B, the then-closed contacts a of a relay 107, to the negative supply bus 56'.

With the transfer relays A and A' thus operated, current for channel I flows from the remote station control power source through a monitoring circuit extending from the positive bus 55' of the remote station, through the contacts a of the sender relay L'S', through the contacts a of relay A', then over L2 to the control station, then through the contacts b of LYA, through the coil of monitoring relay 40, the contacts a of transfer relay A, through the contacts of sender relay LS, through the coil of impulse receiver relay LR, and then through the contacts b of transfer relay A, through another coil of relay 40, through contact c of LYA, through L1 back to the remote station, then through the contacts b of relay A', the coil of L'R', back to the negative supply bus 56'.

Monitoring current for channel II flows over a circuit extending from the positive supply bus 55', through a portion of a potentiometer 60, the coil of a relay 62 at the remote station, the contacts c of relay B', then to the control station over line wire L2B of channel II, through the b contacts of relay LYB, through the coil of relay 41 through the c contacts of relay B, through another coil of relay 41, the contacts c of LYB, then back to the remote station over line wire L1B, then through contacts d of relay B', the coil of relay 62 and then through conductors 63 and 64 to the negative supply bus 56'.

Monitoring—control station

As a result of monitoring current flowing over channels I and II, monitoring relays 40 and 41 at the control station are both in an operated condition. In addition, auxiliary monitoring relays 44 and 45 and relay LZ at the control station are all in an operated condition. The energizing circuit for auxiliary monitoring relay 44 extends from the positive supply bus 55 of the control station, through a manual transfer switch 69, through the then-closed contacts a of a disagreement relay 71 through the then-closed contacts a of monitoring relay 40 and through the coil of auxiliary monitoring relay 44 to the negative supply bus 56. The energizing circuit for the other auxiliary monitoring relay 45 extends from control station supply bus 55, through a manual transfer switch 70, through contacts a of relay 72, contacts a of relay 41, through the coil of relay 45 to the negative supply bus 56. The energizing circuit for relay LZ extends from supply bus 55, through contacts b of relay 44, contacts b of relay 45, the coil of LZ, to the negative supply bus.

To summarize briefly, with the supervisory equipment connected for operation over channel I and with both channels in good working order, the following devices at the control station are in an operated condition: transfer relay A, monitoring relays 40 and 41, auxiliary monitoring relays 44 and 45, and relay LZ. Transfer relay B is in a non-operated condition.

Monitoring—remote station

As a result of monitoring current flowing over channel II, relay 62 at the remote station is energized by direct current flowing from the terminal x to y thereof. This relay 62 however is a polarized relay so constructed that it operates in response to current flowing only in a direction from y to x. In response to normal monitoring current, which flows from x to y, the polarized relay 62 remains in its non-operated position shown with its normally-open contacts a open. The purpose of this relay 62 is to initiate a transfer operation at the remote station from channel I to channel II in response to a reverse polarity impulse being transmitted over channel II as will soon be described in detail.

For initiating a remote station transfer from channel II to channel I, a corresponding polarized relay 73 is also provided at the remote station. This relay 73 operates to close its contacts a only in response to current flowing in a direction from its terminal y to x, and remains non-operated when the current direction is from x to y. With the contact c of transfer relay A' open as during normal operation over channel I, the coil of relay 73 is de-energized, and the relay 73 is therefore non-operated.

Thus, in summary, for normal operation over channel I, the contacts a of each of the two polarized relays 62 and 73 at the remote station are open. Transfer relay A' is in an operated position and transfer relay B' is in a non-operated position.

Monitoring—indication

For providing the dispatcher with an indication of the operative condition of the two channels and an indication of the particular channel to which supervisory equipment is connected, a group of lamps 75, 76, 77 and 78 are provided at the control station. With the supervisory equipment connected for operation over channel I, transfer relay A at the control station will be in an operated condition, as described hereinabove. The contacts i of relay A are therefore closed, establishing an energizing circuit for lamp 77, which when lighted indicates to the dispatcher that the supervisory equipment is connected to channel I for operation thereover. If the supervisory equipment is not connected for operation over channel I, transfer relay A is dropped out, and the lamp 77 is therefore extinguished.

If channel I is in good working order, relay 44 will be in an operated condition, as described hereinabove. The contacts $i$ of the relay 44 will therefore be closed, establishing an energizing circuit for the lamp 75, which when lit indicates to the dispatcher that channel I is in good working order. If channel I fails, relay 44 will drop out as described hereinabove, thus extinguishing the lamp 75 and indicating to the operator that channel I is faulted.

If the supervisory equipment is connected for operation over channel II, transfer relay B at the control station will be in an operated condition. The contacts $i$ of relay B are therefore closed, establishing an energizing circuit for the lamp 78, which indicates to the dispatcher that the supervisory equipment is connected to channel II for operation thereover. If the supervisory equipment is not connected for operation over channel II, transfer relay B is dropped out, and the lamp 78 is therefore extinguished.

If channel II is in good working order, relay 45 will be in an operated condition as described hereinabove. The contacts $i$ of relay 45 will therefore be closed establishing an energizing circuit for the lamp 76, which when lit indicates to the dispatcher that channel II is in good working order. If channel II fails, relay 45 will drop out as described hereinabove, thus extinguishing the lamps 76 and indicating to the operator that channel II is faulted.

*Transfer from channel I to channel II in response to a fault on channel I (control station operation)*

Assume first that the supervisory equipment is connected for operation over channel I and that channel I fails, either as a result of an open-circuit or a short-circuit. Monitoring relay 40 at the control station would no longer receive energizing current from the power supply 55', 56' at the remote station and therefore would drop out, thus opening its contacts $a$. This would open the energizing circuit for the auxiliary monitoring relay 44 at the control station, which drops out after a time delay. Drop out of the auxiliary monitoring relay 44 would cause its contacts $a$ to open, thus interrupting the previously-described energizing circuit for transfer relay A. Drop out of the auxiliary monitoring relay 44 also opens its contacts $b$, thus opening the previously described energizing circuit for the relay LZ. This relay LZ is hereinafter termed the reverse-current-terminating relay and is a time-delay drop out relay. The contacts $a$ of relay LZ therefore remain closed for a predetermined interval after opening of the energizing circuit for relay LZ.

With the contacts $a$ of relay LZ closed prior to drop out of LZ and the contact $c$ of the relay 44 closed in response to drop out of the relay 44, an energizing circuit is established for the relay LYB. This energizing circuit extends from the positive bus 55, through conductors 80 and 81, the then-closed contacts $e$ of relay B, conductor 83, the coil of LYB, contacts $c$ of relay 44, through the contacts $a$ of relay LZ and then to the negative bus 56. In response to establishment of this energizing circuit, relay LYB picks up and closes its contacts $d$ and $e$.

Closing of the contacts $d$ and $e$ of relay LYB acts to connect the control station power source 55, 56 across the line conductors of channel II. As will soon appear more clearly, this results in the transmission over channel II from the control station of current having a reverse polarity with respect to the normal monitoring current which was heretofore being transmitted over channel II. This reverse-polarity current is utilized at the remote station to effect a transfer from channel I to channel II (in a manner which will soon be described in detail). Transmission of this reverse polarity current over channel II continues until the relay LYB drops out. This drop out of LYB is effected in response to opening of the contacts $a$ of relay LZ at the end of the time-delay drop out period for relay LZ. Drop out relay LZ, it will be recalled, was initiated by drop out of the auxiliary monitoring relay 44.

When LYB thus drops out to terminate the reverse-polarity current impulse, it closes its contacts $a$ and this completes an energizing circuit for the coil of transfer relay B. This energizing circuit for transfer relay B extends from the positive bus 55, through the contacts $a$ of LYB, the contacts $a$ of LYA, conductors 86, 87, 88, the contacts $d$ of relay 44, the contacts $d$ of transfer relay A, the coil of relay B, to the negative bus 56. In response to completion of this energizing circuit, relay B picks up, closing its contacts $a$ and $b$ and opening its contacts $c$. This connects the control station supervisory equipment to channel II as previously described.

To prevent the contacts $c$ of transfer relay B from providing a short circuit path across the line conductors L1B and L2B during the previously-described application of the reverse polarity current, the reverse-polarity applying relay LYB is provided with contacts $b$ and $c$. In this connection, operation of relay LYB opened these contacts $b$ and $c$ and therefore prevented current flowing through the contact $c$ of the transfer relay B. Opening of these contacts $b$ and $c$ of LYB causes monitoring relay 41 to drop out momentarily, but the monitoring relay again picks up when LYB drops out to terminate the reverse polarity impulse.

*Transmission of the reverse polarity impulse*

The above noted reverse-polarity current which was transmitted over channel II by closing of the contacts $d$ of $e$ of relay LYB flowed over a circuit extending from the positive supply bus 55 at the control station, through conductors 90 and 91, the contacts $d$ of LYB, line conductor L2B to the remote station, then through the then-closed contact $c$ of relay B', the coil of polarized relay 62 from $y$ to $x$, the top portion of potentiometer 60, conductor 63, the other coil of relay 62 from $y$ to $x$, contacts $d$ of transfer relay B', then over the line wire L1B back to the control station, through the contacts $e$ of relay LYB, the conductors 92 and 93 back to the negative supply bus 56 at the control station. This circuit is illustrated in simplified diagrammatic form in Fig. 3, where relay LYB is shown in its operated position connecting the control station power supply to channel II. It will be noted from Fig. 3 that when this occurs, the remote station supply and the control station power supply are connected in voltage-opposing relationship. The presence of the potentiometer 60 together with conductor 63, however, provides a path which effectively shunts the remote station battery and thus permits the reverse polarity current to flow from the control station battery over channel II substantially independently of the remote station battery.

*Transfer at the remote station*

The reverse-polarity current transmitted over channel II in the above described manner is effective to operate the polarized relay 62 at the remote station inasmuch as current flows from $y$ to $x$, thus causing this relay 62 to close its contacts $a$. This initiates a remote station transfer operation in the following manner. Closing of the contacts $a$ of relay 62 establishes an energizing circuit for an auxiliary transfer-initiating relay 100 at the remote station. This energizing circuit extends from the positive bus 55' of the remote station, through conductors 101 and 102, the contacts $a$ of relay 62, the coil of the auxiliary relay 100, and then to the negative bus 56'. In response to the establishment of this energizing circuit, auxiliary relay 100 picks up, closing its contacts $a$, $b$, and $c$. Closing of contacts $b$ of relay 100 completes an obvious energizing circuit for a relay 105, which, in turn, operates to close its contacts a. This provides an energizing circuit for the coil of relay 107 which extends from the positive bus 55', through conductors 108 and 109, the coil of relay 107, contacts a of relay 105, conductor 129 and the coil of relay 105 to the negative supply bus 56'. This energizing circuit is not immediately effective, however, to produce operation of the relay 107 inasmuch as the coil of relay 107 is then shorted out by a circuit extending from conductor 108, through the contacts b of relay 100 and the contacts c of relay 107.

This short circuit of the coil of relay 107 is removed by subsequent action of the auxiliary transfer initiating relay 100 when the reverse polarity current being transmitted over channel II terminates. In this connection, when the reverse polarity impulse terminates polarized relay 62 drops out, opening the energizing circuit for the auxiliary relay 100, thus allowing the auxiliary relay to drop out and open its contacts b to remove the short circuit about the coil of relay 107.

When this short circuit is removed, relay 107 is operated by current supplied over its previously described energizing circuit, thus closing its contacts b and d and opening its contacts c and a. Opening of the contacts a of relay 107 interrupts the energizing circuit for the transfer relay A' thereby causing A' to drop out. This drop out of transfer relay A' opens its contacts a and b and therefore disconnects the remote station supervisory equipment from channel I in the general manner described hereinabove. Drop out of transfer relay A' also closes its contacts c and d and this connects channel II to the remote station battery independently of the remote station supervisory equipment so as to provide for monitoring of channel II by current supplied from the remote station battery, as was generally described hereinabove.

Drop out of the transfer relay A' also closes its contacts e, and this completes an energizing circuit for transfer relay B'. This energizing circuit for B' extends from the positive bus 55', through the contacts e of relay A', the coil of transfer relay B', the contacts b of relay 107, to the negative bus 56'. In response to completion of this energizing circuit, transfer relay B' picks up and thus closes its contacts a and b and opens its contacts c and d. Closing of these contacts a and b effectively connects the remote station supervisory equipment to channel II. Opening of contacts c and d interrupts the monitoring circuit which had previously connected channel II to the remote station battery independently of the remote station supervisory equipment.

Thus, with the transfer relay A' in its non-operated position and transfer relay B' in its operated position, the transfer at the remote station has been completed, and the supervisory equipment is connected for operation over channel II and is effectively disconnected from channel I.

The specific circuit over which supervisory codes are then transmitted extends from positive bus 55' at the remote station, through the contacts of L'S', the contacts a of transfer relay B', the line wire L2B to the control station, the contacts b of relay LYB, the coil of relay 41, the contacts a of relay B, the contacts of LS, the coil of relay LR, the contacts b of relay B, the coil of relay 41, the contacts c of relay LYB, the line wire L1B back to the remote station, the contacts b of the relay B', the coil of L'R', to the negative bus 56' at the remote station.

Control station after transfer to channel II

As a result of current transmitted over channel II under these conditions, monitoring relay 41 at the control station will be in an operated condition, as will be auxiliary monitoring relay 45, and the relay LZ.

When auxiliary relay 45 is in an operated position, the energizing circuit which holds transfer relay B in an operated position extends from the positive supply bus 55 through the contacts a of relay LYB, the contacts a of relay LYA, conductors 86 and 87, the contacts f of relay B, the contacts a of relay 45, the contacts d of relay A, the coil of relay B and then to the negative bus 56.

When channel I is restored to good working order, monitoring current will flow from the remote station power source over channel I independently of the remote station supervisory equipment. This monitoring circuit extends from the positive bus 55' at the remote station, through a conductor 114, a portion of a potentiometer 115, the coil of polarized relay 73, contacts c of relay A', line wire L2 to the control station, the contacts b of LYA, the coil of monitoring relay 40, the contacts c of relay A, the other coil of the relay 40, the contacts c of relay LYA, then over line wire L1 to the remote station, then through the contacts d of relay A', the coil of the polarized relay 73, through conductors 63 and 64 to the negative bus 56' at the remote station. Monitoring current flowing over channel I will maintain monitoring relay 40 at the control station in an operated position. This in turn holds auxiliary monitoring relay 44 in an operated position.

Automatic transfer from channel II to channel I in response to a fault on channel II Assume now that the supervisory equipment is connected for operation over channel II, as a result of the above-described transfer operation, and that channel II subsequently fails. Assume also that channel I is in good working order at the time channel II fails. Transfer from channel II to channel I will be effected in a manner corresponding to that described hereinabove relative to transfer from channel I to channel II. In this regard, when failure of channel II occurs, the channel II monitoring relay 41 at the control station will cease receiving current from the remote station battery. This will cause monitoring relay 41 to drop out, thereby dropping out the auxiliary monitoring relay 45. Auxiliary monitoring relay 45 drops out after a time delay, thus opening its contacts a and thereby interrupting the previously-described energizing circuit for transfer relay B. Transfer relay B drops out, and thus disconnects the control station supervisory equipment from channel II.

Drop out of the auxiliary monitoring relay 41 also initiates transmission of a reverse polarity impulse from the control station to the remote station in a manner corresponding to that previously described in connection with the transfer from channel I to channel II. In this case, however, the reverse polarity impulse is transmitted over channel I instead of channel II and by the relay LYA instead of the relay LYB. More specifically, when the auxiliary monitoring relay 45 drops out, it closes its contacts c, thereby establishing an energizing circuit for the reverse-polarity current applying relay LYA. This energizing circuit extends from the positive bus 55 at the control station, through conductors 80 and 81, contacts e of relay A, conductor 120, the coil of relay LYA, through the contacts c of relay 45, the contacts b of relay LZ to the negative bus 56 at the control station. Completion of this energizing circuit causes LYA to pick up, thus closing its contacts e and f. This connects the control station power source across the line wires L1 and L2, which results in the transmission of current over channel I having a reverse polarity with respect to the monitoring current previously being transmitted. This reverse polarity current is utilized at the remote station in a manner corresponding to that previously described to effect a transfer of the remote station supervisory equipment from one channel to the other, as will soon be explained in more detail.

Termination of the reverse polarity current is effected by the drop out of relay LZ, which upon drop out opens its contacts b to interrupt the energizing circuit for the relay LYA. The energizing circuit for this relay LZ had been opened by the previously-described drop out of the auxiliary monitoring relay 45, but the relay LZ, having a time-delay drop out characteristic, dropped out only after an interval of sufficient duration to allow for application of the reverse polarity current to channel I for an effective length of time.

*Transmission of the reverse polarity impulse over channel I*

The above noted reverse polarity current which was transmitted over channel I by closing of the contacts *e* and *f* of relay LYA flowed over a circuit extending from the positive supply bus 55 at the control station, through conductors 90, 121, contacts *e* of the relay LYA, the line wire L2 to the remote station, the contacts *c* of relay A', the coil of relay 73, the top portion of the potentiometer 115, conductor 63, the other coil of relay 73, the contacts *d* of relay A', the line wire L1 back to the control station, the contacts *f* of the relay LYA, the conductor 93 back to the negative supply bus 56 at the control station.

*Transfer at the remote station from channel II to channel I*

The reverse polarity current transmitted over channel I in the above described manner flows from the *y* to *x* terminals of polarized relay 73 at the remote station and is therefore effective to operate the relay 73 thereby causing the relay 73 to close its contacts *a*. This initiates a remote station transfer operation in the following manner. Closing of the contacts *a* of relay 73 established an energizing circuit for the auxiliary transfer-initiating relay 100, which circuit extends from the positive bus 55' at the remote station through conductors 101 and 125, the coil of relay 100 to the negative supply bus 56'. In response to establishment of this energizing circuit, the relay 100 picks up closing its contacts *a*, *b*, and *c*. Relays 105 and 107, it will be recalled, are then in their operated positions as a result of the previously-described transfer from channel I to channel II. As a result when relay 100 closes its contacts *c*, a short circuit path is established about the coil of relay 105 thereby causing relay 105 to drop out. This short circuit path extends from one terminal of the coil of relay 105, through conductor 127, the contacts *c* of relay 100, the contacts *d* of relay 107, conductor 128, contacts *a* of relay 105 and the conductor 129 to the other terminal of the coil of relay 105. Relay 107 remains in an operated position so long as the reverse polarity current continues inasmuch as this reverse polarity current maintains relay 100 operated, thus holding the contacts *c* of relay 100 closed and maintaining a seal-in circuit for the relay 107. This seal-in circuit extends from the positive bus 55' through conductors 108, 109, the coil of relay 107, conductor 128, contacts *d* of relay 107, contacts *c* of relay 100, and conductor 127 to negative supply bus 56'. When the reverse polarity impulse ceases, however, relay 100 drops out, opening its contacts *c* thereby interrupting this seal-in circuit and causing relay 107 to drop out. When relay 107 drops out, it opens its contacts *b* thus interrupting the energizing circuit for the transfer relay B'. When B' drops out it opens its contacts *a* and *b* to disconnect the remote stations supervisory equipment from channel II.

Drop out of transfer relay B' also closes the contacts *e* of relay B' thereby completing an energizing circuit for relay A'. Relay A' responds by operating to close its contacts *a* and *b* thereby connecting the remote station supervisory equipment to channel I. The transfer is then complete, and the supervisory equipment has been restored to channel I with the various relays occupying the same positions as described hereinabove for supervisory operation over channel I.

*Manual transfer*

A manual transfer of supervisory equipment to or from either channel can be initiated at the control station by operating an appropriate manual transfer switch 69 or 70. In this regard, if the supervisory equipment is connected for operation over channel I and a transfer to channel II is desired, the control switch 69 is operated. This opens the energizing circuit for the auxiliary monitoring relay 44 in the same manner as drop out of the monitoring relay 40 had done during the above-described automatic transfer from channel I to channel II. As a result, auxiliary monitoring relay 44 responds in the same manner as described hereinabove to initiate a transfer from channel I to channel II.

If the supervisory equipment is connected for operation over channel II and a transfer to channel I is desired, the control switch 70 is operated. This opens the energizing circuit for the auxiliary monitoring relay 45 in the same manner as drop out of the monitoring relay 41 had done during the above described automatic transfer from channel II to channel I. As a result, auxiliary monitoring relay 45 responds in the same manner as described hereinabove to initiate a transfer from channel II to channel I.

*Preventing transfer onto a faulted channel*

The transfer equipment of our invention is continuously sensitive to the working condition of both channels and will effect a transfer only onto a channel which is in good working order. For example, assume that the supervisory equipment is operating over channel I and that channel II fails. Failure of channel II will cause channel II monitoring relay 41 to drop out, thereby interrupting the energizing circuit for the auxiliary monitoring relay 45. This will cause relay 45 to drop out, thereby interrupting the energizing circuit for the reverse-current controlling relay LZ and causing relay LZ to drop out. With relay LZ dropped out the reverse-polarity applying relays LYA and LYB are disabled. Under such conditions, the transfer equipment is not capable of applying a reverse polarity impulse to channel II in response to a failure of channel I and is therefore ineffective to transfer the remote station supervisory equipment to channel II so long as channel II remains faulted. Also, under these circumstances, no transfer is effected at the control station in response to a fault on channel I because when auxiliary monitoring relay 45 had dropped-out as above-described in response to a fault on channel II, it closed its contacts *d* to complete a seal-in circuit for the transfer relay A. Thus, when auxiliary monitoring relay 44 drops out in response to a fault on channel I, opening of its contacts *a* does not produce drop-out the transfer relay A. Transfer relay A simply remains sealed-in through a circuit including the contacts *d* of relay 45 and its own seal-in contacts *h*, thus preventing any transfer at the control station.

*Channel failure during code transmission*

If the channel in use should fail while a code is being transmitter, it is important that such failure and subsequent automatic transfer should not result in incorrect operation of the supervisory equipment. To this end, if channel failure occurs during transmission of a code initiated by the dispatcher at the control station, then the supervisory equipment will be automatically reset to its normal-at-rest posiion (after an automatic transfer has occurred), and the dispatcher will then have another opportunity to transmit the desired code to the remote station. More specifically, if a channel failure should so occur, the dispatcher will note this fact from the indicating lamps 75—78. If the lamps indicate that a successful channel transfer has been completed, he may again initiate transmission of the code over the channel to which the supervisory equipment is then connected.

Reset of the supervisory equipment under these circumstances is effected as follows. Assume that the control station supervisory equipment is transmitting a code over channel I when failure of channel I occurs. A series of operations will take place which will cause relay LYB to pick-up, all as previously described in detail under "Transfer from Channel I to Channel II in Response to a Fault on Channel I." This will close the contacts $f$ of relay LYB which, in turn, will complete an energizing circuit for an auxiliary reset relay LYX. LYX will respond by closing its contacts $a$ to complete a circuit for the relay LO in the control station supervisory equipment.

Relay LO corresponds to an identically designated relay in the Purcell patent and operation thereof is effective to reset the supervisory equipment to its normal-at-rest position, as explained in detail in the Purcell patent. Thus, when the relay LYX closes its contacts $a$ in response to operation of relay LYB during a transfer operation, the control station supervisory equipment is reset to its normal-at-rest position.

For delaying the attempted transmission of codes by the control station supervisory equipment until completion of a transfer operation, relay LYX is provided with an additional set of contacts $b$ shown connected in series with the coil of the sender relay LS. These contacts remain open so long as LYB is in an operated position and thus prevent the control station supervisory equipment from supplying codes to sender relay LS during the transfer operation. When relay LYB drops out after completion of the transfer, relay LYX drops out after a time delay and the input circuit to sender relay LS is no longer disabled by the contacts $b$ of relay LYX. Sender relay LS may then send out the desired codes.

With respect to the remote station, channel failure will initiate a series of operations which will cause the auxiliary transfer-initiating relay 100 at the remote station to pick-up, as described hereinabove. Pick-up of this relay 100 will close the contacts $a$ completing an energizing circuit for the auxiliary reset relay 150. Relay 150 will respond by closing its contacts $a$ to complete an energizing circuit for a relay R'L' in the remote station supervisory equipment. This relay R'L' corresponds to an identically designated relay in the supervisory equipment of the Purcell patent and, thus, operation thereof will simply reset the remote station supervisory equipment to its normal-at-rest position, as explained in the Purcell patent. Assuming that the code had been initiated by the dispatcher at the control station, the remote station supervisory equipment will normally remain in its normal-at-rest position until the dispatcher subsequently transmits another code. Thus, it will be seen that failure of channel I during transmission of a code initiated by the dispatcher simply resulted in reset of the supervisory equipment at both stations.

If channel failure should occur during the time a code indicative of an automatic change in the position of an apparatus-unit is being transmitted from the remote station, then a similar reset of the supervisory equipment will occur upon channel transfer. In this case, however, the remote station supervisory equipment will again initiate the code which had been interrupted by channel transfer. To this latter end, the relay R'L' at the remote station is connected in the remote station supervisory equipment in the same manner as in the Purcell patent. Accordingly, if the code originated at the remote station, then operation of relay R'L' acts not only to reset the remote station supervisory equipment but also to cause the remote station supervisory equipment to repeat the same code which the equipment had attempted to transmit immediately preceding the reset operation. Thus, if under these circumstances, when R'L' is operated as a result of a transfer operation, it will cause the remote station supervisory equipment to repeat any code which might have been interrupted by the transfer operation.

Although only a transfer from channel I to channel II during code-transmission has been described, it is to be understood that a similar transfer and reset of the supervisory equipment will occur if channel II should fail while supervisory codes are being transmitted thereover. In this latter case, the relay LYA instead of LYB would initiate reset of the control station supervisory equipment. Since this relay LYA has its contacts $d$ connected in parallel with the contacts $f$ of relay LYB, it will be apparent that operation of relay LYA under these circumstances resets the supervisory equipment in the same manner as operation of relay LYB did in the above description. The remote station supervisory equipment is also reset in the same manner as in the above description.

*Automatic transfer upon a condition of disagreement*

As a result of an incomplete transfer operation, or some extraneous condition, there is a possibility that the supervisory equipment at one station will be connected for operation over one channel and the supervisory equipment at the other channel will be connected for operation over the other channel. The transfer equipment of our invention is capable of automatically correcting for this condition of disagreement by initiating, in response to an automatic operation initiated at the remote station, a series of corrective operations which will connect the supervisory equipment at both stations to the same channel.

This automatic corrective action will be explained by assuming first that both channels are in good working order and that the control station supervisory equipment is set up to operate over channel I and the remote station supervisory equipment is set up to operate over channel II. Under these conditions transfer relay B' at the remote station and transfer relay A at the control station will be in an operated position, whereas transfer relay A' at the remote station and transfer relay B at the control station will be in a non-operated position. Such being the case, it will be readily apparent from Fig. 1, that channel II will be connected by means of the remote station transfer relay B' to the remote station power source 55', 56' through the remote station supervisory equipment. Channel II will be isolated from the control station supervisory equipment, however, by the relay B, which will be in its non-operated position. Referring to Fig. 2, the specific circuit over which the remote station supervisory equipment will then attempt to operate extends from the positive bus 55' at the remote station, through the contacts L'S', the contacts $a$ of relay B', line conductor L2B to the control station, the contacts $b$ of relay LYB, the coil of relay 41, the contacts $c$ of relay B, the other coil of relay 41, the contacts $c$ of relay LYB, then over the line wire L1B back to the remote station, through the contacts $b$ of relay B', the coil of relay L'R' to the negative supply bus 56'.

Under the assumed conditions, channel I is energized from the remote station battery 55', 56' independently of the remote station supervisory equipment by virtue of the fact that the transfer relay A' is dropped-out, but channel I is connected to the control station supervisory equipment by virtue of the fact that the transfer relay A at the control station is in an operated position. The specific circuit involved as a result of these connections extends from the positive bus 55' at the remote station, through conductor 114, potentiometer 115, the coil of relay 73, the contacts $c$ of relay A', over the line wire L2 to the control station, the contacts $b$ of the relay LYA, the coil of relay 40, the contacts $a$ of the relay A, the contacts of relay LS, the coil of LR, the contacts $b$ of relay A, the other coil of relay 40, the contacts $c$ of relay LYA, and then back to the remote station over line wire L1 through the contacts $d$ of the relay A', the coil of relay 73, the conductors 63 and 64 to the negative bus 56'.

With the two stations connected as above described, the following devices at the control station will be in an operated position: transfer relay A, monitoring relays 40 and 41, auxiliary monitoring relays 44 and 45, and reverse-polarity terminating relay LZ. Transfer relay B will be in a non-operated position.

Under these conditions, the energizing circuit for transfer relay A at the control station will extend from the positive supply bus 55 through the contacts *a* of LYB, the contacts *a* of relay LYA, the contacts *a* of relay 44, the contacts *d* of relay B, the coil of relay A to the negative bus 56. The energizing circuit for the auxiliary monitoring relay 44 extends from the positive bus 55 through switch 69, the contacts *a* of relay 71, the contacts *a* of relay 40, the coil of relay 44, to the negative supply bus 56. The energizing circuit for the other auxiliary monitoring relay 45 extends from the positive bus 55 through control switch 70, the contacts *a* of the relay 72, the contacts *a* of the relay 41, the coil of the relay 45 to the negative supply bus 56. The energizing circuit for LZ extends from the positive bus 55, through the contacts *b* of relay 44, the contacts *b* of the relay 45, the coil of LZ to the negative bus 56.

Assume now that one of the apparatus-units assigned to the remote station supervisory equipment automatically changes its position. The remote station equipment will respond by causing the relay L'S' to begin opening and closing its contacts for the purpose of generating a pulse code corresponding to the automatic operation which had occurred. When relay L'S' in coding opens its contacts to produce the first pause between pulses, the circuit extending through the remote station supervisory equipment over channel II will be opened, and thus monitoring relay 41 at the control station will have its energizing circuit open and will therefore drop out. This will open its contacts *a* and closes its contacts *b*. Closing of the contacts *b* of relay 41 establishes an energizing circuit for the disagreement relay 72. This circuit extends from the positive bus 55, through conductor 130, the contacts *e* of relay 45, the contacts *g* of relay A, the contacts *b* of relay 41, the coil of the disagreement relay 72, the conductor 132, the contact *c* of the relay LZ to the negative supply bus 56. In response to completion of this energizing circuit, disagreement relay 72 will pick up thereby opening its contacts *a* and closing its contacts *b*, *c*, and *d*. Closing of the contacts *c* seals in the relay 72. Opening of the contacts *a* of the relay 72 interrupts the previously described energizing circuit for the auxiliary monitoring relay 45 thereby causing it to drop out. Drop-out of auxiliary monitoring relay 45 closes its contacts *c* and thus completes an energizing circuit for the relay LYA. The energizing circuit for relay LYA extends from positive bus 55 through the contacts *b* of relay 72 the coil of LYA the contacts *c* of relay 45 the contacts *b* of relay LZ to the negative bus 56. Completion of this energizing circuit causes relay LYA to operate and thereby close its contacts *e* and *f*. This results in reverse polarity current being applied to channel I, as has been previously described. This reverse polarity current is utilized to cause the remote station supervisory equipment to effect a transfer in a manner similar to that previously described. This particular transfer at the remote station will soon be explained in greater detail, however, after completion of the present discussion of the control station operation. Auxiliary monitoring relay 44, when it drops out in the manner described hereinabove, opened the energizing circuit for relay LZ. Relay LZ remained in an operated position temporarily, allowing the above described reverse polarity current to be applied to channel I, but after a time-delay, dropped out to terminate the reverse polarity current, as has been previously described. The transfer relays A and B at the control station have remained unaffected by this series of operations and therefore the control station supervisory equipment remains connected to channel I.

At the remote station, reception of the reverse polarity impulse over channel I causes the polarized relay 73 to operate to close its contacts *a*. This completed an energizing circuit for the auxiliary relay 100, and the auxiliary relay responded to initiate a transfer of the remote station supervisory equipment from channel II to channel I in the same manner as has been previously described.

Thus, the supervisory equipment at both stations is now connected to channel I, and the disagreement has been corrected, all in response to the initiation of an automatic operation code from the remote station.

With regard to the above-described corrective action, it might be well at this point to note that the disagreement relay 72 is disabled so long as the supervisory equipments at both stations are connected to the same channel. In this regard, when channel II is connected to the control station supervisory equipment, transfer relay A at the control station is dropped out and its contacts *g* are therefore open so as to prevent completion of an energizing circuit for the disagreement relay 72. With channel II connected to the control station supervisory equipment, it is normal for codes to be transmitted over channel II. Accordingly, with the contacts *g* of relay A opened, as will be the case when channel II is connected to control station supervisory equipment, drop-out of the channel II monitoring relay 41 during normal code-transmission over channel II is not effective to produce operation of the disagreement relay 72. It is only when channel I is connected to the control station supervisory equipment that the presence of a code on channel II is indicative of a condition of disagreement. Under these conditions, the contacts *g* of transfer relay A are closed and thus when channel II monitoring relay 41 drops out in response to a code, it produces operation of the disagreement relay 72, as is desired to initiate the proper corrective action.

The other disagreement relay 71 is coordinated with the transfer relay B and with the channel I monitoring relay 40 in a corresponding manner, and it will therefore be apparent that this disagreement relay 71 is capable of sensing the type of disagreement condition wherein the control station supervisory equipment is connected to channel II with the remote station supervisory equipment connected to channel I. In this case, in response to drop-out of the channel I monitoring relay 40, disagreement relay 71 will operate and initiate a corrective transfer of the remote station supervisory equipment from channel I to channel II.

*Reinitiation of a code begun when disagreement was present*

It is desirable that the code begun at the remote station when a condition of disagreement exists be transmitted to the control station supervisory equipment once this condition has been corrected. To this end, when the auxiliary transfer-initiating relay 100 at the remote station picks up to begin correcting the disagreement, in the above described manner, it completes a circuit to the auxiliary reset relay 150. This relay responds by closing its contacts *a*, thus completing an energizing and operating circuit for the relay R'L' in the remote station supervisory equipment.

As previously noted this relay R'L' corresponds to an identically-designated relay in the apparatus of the Purcell patent and is therefore capable upon operation of resetting the remote station supervisory equipment and causing this equipment to reinitiate the particular code which was in progress before reset occurred. Thus, operation of relay R'L' in the above-described manner resets the remote station supervisory equipment and re-initiates the code which was being transmitted before correction of the disagreement. The disagreement now having been corrected, the code from the remote station is now transmitted over the channel to which the control station supervisory equipment is connected, and the control station supervisory equipment therefore receives the code and is capable of correctly responding.

While we have shown and described a particular embodiment of our invention, it will be obvious to those skilled in the art that various changes and modifications may be made without departing from the invention in its broader aspects, and we therefore intend in the appended claims to cover all such changes and modifications as fall within the true spirit and scope of our invention.

What we claim as new and desire to secure by Letters Patent of the United States is:

1. In a supervisory control system, a control station, a remote station, a pair of alternate channels interconnecting said stations, means at a first one of said stations for continuously applying unidirectional voltage to each of said channels to cause unidirectional current normally to flow over both of said channels, supervisory equipment at said control station and at said remote station adapted when each of said equipments is connected to a single one of either of said channels to perform preselected supervisory operations in response to the transmission over the connected channel of predetermined impulse codes, said supervisory equipments acting to transmit said codes by intermittently interrupting and re-establishing the current flowing over said connected channel, each of said codes comprising a series of impulses of the same polarity as the current normally flowing over the connected channel spaced apart by zero-current intervals having a predetermined maximum duration, switching means at both of said stations for connecting said supervisory equipment to a single one of either of said channels, and transfer-controlling means at a second one of said stations responsive to the absence of current flowing over said connected channel for a duration exceeding said maximum for causing said switching means to transfer said supervisory equipments from said connected channel to the other channel, said transfer-controlling means effecting operation of the switching means at said first station by causing a signal to be transmitted over said other channel from said second to said first station, said supervisory equipments acting after said transfer to transmit codes over said other channel by intermittently interrupting and re-establishing the current normally flowing thereover.

2. The apparatus of claim 1 in combination with means for resetting the supervisory equipments to their normal-at-rest conditions in response to a channel-transfer operation occurring during code-transmission.

3. The apparatus of claim 2 in which said resetting means also acts to cause said remote station supervisory equipment upon completion of the transfer operation automatically to reinitiate any interrupted code which might have originated at the remote station.

4. In a supervisory control system, a control station, a remote station, a pair of alternate channels interconnecting said stations, means at said remote station for continuously applying unidirectional voltage to each of said channels to cause unidirectional current normally to flow over both of said channels, supervisory equipment at said control station and at said remote station adapted when each of said equipments is connected to a single one of either of said channels to perform preselected supervisory operations in response to the transmission over the connected channel of predetermined impulse codes, the supervisory equipment at said control station acting to transmit said codes by intermittently interrupting and re-establishing the current flowing over said connected channel, each of said codes comprising a series of impulses of the same polarity as the current normally flowing over the connected channel spaced apart by zero-current intervals having a predetermined maximum duration, switching means at both stations for connecting said supervisory equipments to said first channel and for disconnecting said supervisory equipments from said second channel whereby to enable said supervisory equipments to operate over said first channel, transfer-controlling means at said control station responsive to the absence of current flowing over said first channel for a duration exceeding said predetermined maximum for causing said switching means to disconnect said supervisory equipment from said first channel and to connect said supervisory equipment to said second channel whereby to enable said supervisory equipment to operate over said second channel said transfer-controlling means effecting operation of the switching means at the remote station by causing a signal to be transmitted from said control station to said remote station over said second channel.

5. In a supervisory control system, a control station, a remote station, a pair of alternate channels interconnecting said stations, means at said remote station for continuously applying unidirectional voltage to each of said channels to cause unidirectional current normally to flow over both of said channels, supervisory equipment at said control station and at said remote station adapted when each of said equipments is connected to a single one of either of said channels to perform preselected supervisory operations in response to the transmission over the connected channel of predetermined impulse codes, the supervisory equipment at each of said stations acting to transmit said codes by intermittently interrupting and re-establishing the current flowing over the connected channel, each of said codes comprising a series of impulses spaced apart by predetermined pauses, switching means at said remote station for connecting said control station supervisory equipment to a single one of either of said channels, switching means at said remote station for connecting said remote station supervisory equipment to a single one of either of said channels, said system being subject to a condition of disagreement wherein the switching means at said remote station connects the remote station supervisory equipment to one channel while disconnecting it from the other channel and the switching means at the control station connects the control station supervisory equipment to said other channel while disconnecting it from said one channel, a monitoring relay normally picked up by monitoring current flowing over said one channel but dropping out in response to the normal pauses in supervisory codes transmitted over said one channel, transfer-controlling means operable to cause the switching means at the remote station to transfer the remote station supervisory equipment from said one channel to said other channel thereby to correct said condition of disagreement, disagreement relay means when enabled operable in response to drop out of said monitoring relay to cause said transfer-controlling means to produce said corrective action at the remote station, means responsive to the position of said switching means for disabling said disagreement relay means so long as the supervisory equipments at the two stations are connected to the same channel and for enabling said disagreement relay means when a condition of disagreement exists, whereby under a disagreement condition, the disagreement relay means is capable of initiating corrective action in response to drop out of said monitoring relay.

6. The supervisory system of claim 5 in which said transfer controlling means comprises means for applying to said other channel a current impulse having a polarity reversed with respect to the current normally flowing over said channel, and means at said remote station responsive to said reverse polarity current for producing a corrective transfer operation by the switching means at the remote station.

7. In a supervisory control system, a control station, a remote station, a pair of alternate channels interconnecting said stations, means at said remote station for continuously applying unidirectional voltage to each of said channels to cause unidirectional current normally to flow over both of said channels, supervisory equipment at said control station and at said remote station adapted when each of said equipments is connected to a single one of either of said channels to perform preselected supervisory operations in response to the transmission over the connected channel of predetermined impulse codes, the supervisory equipment at said control station acting to transmit said codes by intermittently interrupting and re-establishing the current flowing over said connected channel, each of said codes comprising a series of impulses spaced apart by intervals having a predetermined maximum duration, first switching means at the control station for connecting said control station supervisory equipment to a single one of either of said channels, second switching means at the remote station for connecting said remote station supervisory equipment to a single one of either of said channels and to the same channel to which the control station supervisory equipment is connected, transfer-initiating means at said control station responsive to the absence of current flowing over the connected channel for an interval exceeding said predetermined maximum for causing (a) said first switching means to transfer said control station supervisory equipment from the connected channel to the other channel and (b) for applying unidirectional current of a polarity reverse to normal current to said other channel, and transfer-controlling means at said remote station responsive to said reverse polarity current for causing the switching means at said remote station to transfer said remote station supervisory equipment from said connected channel to the other channel.

8. The system of claim 7 in which said transfer-controlling means comprises a polarized relay operable by said reverse-polarity current to initiate transfer at said remote station, said polarized relay having an operating coil connected in series with said other channel and in series with the source of normal monitoring current for said other channel, and a shunting circuit connected across the terminals of said source and in series with said coil to allow said reverse polarity current to by-pass said source and to flow through said coil to operate the polarized relay.

9. In a supervisory control system, a control station, a remote station, a pair of alternate channels interconnecting said stations, means at said remote station for continuously applying unidirectional voltage to each of said channels to cause unidirectional current normally to flow over both of said channels, supervisory equipment at said control station and at said remote station adapted when each of said equipments is connected to a single one of either of said channels to perform preselected supervisory operations in response to the transmission over the connected channel of predetermined impulse codes, the supervisory equipment at said control station acting to transmit said codes by intermittently interrupting and re-establishing the current flowing over said connected channel, each of said codes comprising a series of impulses spaced apart by intervals having a predetermined maximum duration, first switching means at the control station for connecting said control station supervisory equipment to a single one of either of said channels, second switching means at the remote station for connecting said remote station supervisory equipment to a single one of either of said channels and to the same channel to which the control station supervisory equipment is connected, transfer-initiating means at said control station responsive to the absence of current flowing over the connected channel for an interval exceeding said predetermined maximum (a) for causing said first switching means to disconnect said control station supervisory equipment from said channel and (b) for applying current of a polarity reverse to normal current to the other channel, means at said control station for terminating said reverse polarity current and for thereafter causing said switching means at the control station to connect said control station supervisory equipment to said other channel, transfer-controlling means at said remote station conditioned by said reverse polarity current for control of said second switching means, said transfer-controlling means being responsive to termination of said reverse polarity current for causing said second switching means to transfer said remote station supervisory equipment from said connected channel to the other channel.

10. The supervisory control system of claim 4 in combination with monitoring relay means responsive to the absence of current flowing over said second channel during the time said first channel is connected to said supervisory equipments for rendering the switching means at the control station incapable of effecting transfer of the control station supervisory equipment onto said second channel while said second channel is faulted.

References Cited in the file of this patent
UNITED STATES PATENTS

| | | |
|---|---|---|
| 2,135,295 | Stewart et al. | Nov. 1, 1938 |
| 2,280,009 | Rosensteel | Apr. 14, 1942 |
| 2,634,401 | Hill | Apr. 7, 1953 |
| 2,653,998 | Derr | Sept. 29, 1953 |

FOREIGN PATENTS

| | | |
|---|---|---|
| 502,955 | Belgium | May 15, 1951 |